US011154937B2

(12) United States Patent
Ishikawa

(10) Patent No.: US 11,154,937 B2
(45) Date of Patent: Oct. 26, 2021

(54) TOOL HOLDER

(71) Applicant: NT TOOL CORPORATION, Takahama (JP)

(72) Inventor: Hitoshi Ishikawa, Takahama (JP)

(73) Assignee: NT TOOL CORPORATION, Takahama (JP)

( * ) Notice: Subject to any disclaimer, the term of this patent is extended or adjusted under 35 U.S.C. 154(b) by 79 days.

(21) Appl. No.: 16/613,701

(22) PCT Filed: May 11, 2018

(86) PCT No.: PCT/JP2018/018423
§ 371 (c)(1),
(2) Date: Nov. 14, 2019

(87) PCT Pub. No.: WO2018/212107
PCT Pub. Date: Nov. 22, 2018

(65) Prior Publication Data
US 2020/0298321 A1    Sep. 24, 2020

(30) Foreign Application Priority Data
May 17, 2017  (JP) .............................. JP2017-098335

(51) Int. Cl.
*B23B 31/08* (2006.01)
*B23B 31/20* (2006.01)
(Continued)

(52) U.S. Cl.
CPC .......... *B23B 31/083* (2013.01); *B23B 31/208* (2013.01); *B23B 31/16* (2013.01);
(Continued)

(58) Field of Classification Search
CPC .............. B23B 31/16; B23B 2260/068; B23B 2270/06; B23B 2231/54; B23B 31/208; B23B 31/083; B23Q 1/44; B23G 1/46
See application file for complete search history.

(56) References Cited

U.S. PATENT DOCUMENTS 5,915,892 A    6/1999  Glimpel et al.
6,640,911 B2   11/2003 Lieser et al.
(Continued)

FOREIGN PATENT DOCUMENTS

| CN | 1396988 A | 2/2003 |
| DE | 2857553 A1 | 7/1980 |

(Continued)

OTHER PUBLICATIONS

English translation of the International Search Report dated Nov. 22, 2018 for parent application No. PCT/JP2018/018423.
(Continued)

*Primary Examiner* — Eric A. Gates
*Assistant Examiner* — Paul M Janeski
(74) *Attorney, Agent, or Firm* — J-Tek Law PLLC; Jeffrey D. Tekanic; Scott T. Wakeman

(57) ABSTRACT

A tool holder includes a tubular body having a shank on a first axial end portion, a tool gripping portion on a second axial end portion, and an elastic segment interposed between the shank and the tool gripping portion in the axial direction of the body. The elastic segment is more elastically deformable along the axial direction and around a circumferential direction of the tubular body than the shank and the tool gripping portion owing to a plurality of voids that extend through the elastic segment from an outer peripheral side of the tubular body to an inner peripheral side of the tubular (Continued)

body. Each of the voids includes segments that extend around the circumferential direction and along the axial direction of the tubular body.

20 Claims, 4 Drawing Sheets

(51) Int. Cl.
*B23B 31/16* (2006.01)
*B23Q 1/44* (2006.01)
*B23G 1/46* (2006.01)

(52) U.S. Cl.
CPC ............ *B23B 2231/54* (2013.01); *B23G 1/46* (2013.01); *B23Q 1/44* (2013.01)

(56) References Cited

U.S. PATENT DOCUMENTS

| | | |
|---|---|---|
| 2002/0094876 A1 | 7/2002 | Johnson et al. |
| 2003/0138303 A1 | 7/2003 | Baxivanelis et al. |
| 2008/0185793 A1 | 8/2008 | Haimer et al. |
| 2009/0324351 A1 | 12/2009 | Komine et al. |
| 2011/0170964 A1 | 7/2011 | Rabaté et al. |
| 2013/0292913 A1 | 11/2013 | Teusch |
| 2013/0300071 A1 | 11/2013 | Teusch |
| 2014/0159322 A1 | 6/2014 | Suruga et al. |
| 2015/0030407 A1 | 1/2015 | Chen |
| 2016/0193666 A1 | 7/2016 | Haimer |
| 2017/0056979 A1 | 3/2017 | Krause et al. |

FOREIGN PATENT DOCUMENTS

| | | |
|---|---|---|
| DE | 9201037 U1 | 4/1992 |
| EP | 1177847 A1 | 2/2002 |
| EP | 1839786 A1 | 10/2007 |
| EP | 2106869 A1 | 10/2009 |
| EP | 2106869 B1 | 9/2012 |
| JP | H0253503 A | 2/1990 |
| JP | H0760513 A | 3/1995 |
| JP | 2002046020 A | 2/2002 |
| JP | 2008012613 A | 1/2008 |
| JP | 2011183518 A | 9/2011 |
| JP | 2012011474 A | 1/2012 |
| JP | 2012091251 A | 5/2012 |
| JP | 2013220529 A | 10/2013 |
| JP | 2017185587 A | 10/2017 |
| JP | 2018024065 A | 2/2018 |
| SU | 837581 A1 | 6/1981 |
| WO | 2008105043 A1 | 9/2008 |
| WO | 2013001624 A1 | 1/2013 |

OTHER PUBLICATIONS

English translation of the Written Opinion of the International Searching Authority in PCT/JP2018/018423.

European Search Report from the European Patent Office dated May 29, 2020 in related application No. EP 18802299, including European Search Opinion, Supplementary European Search Report and examined claims 1-12.

Office Action and Search Report from the Chinese Patent Office dated May 8, 2020 in related Chinese application No. 201880032003, and translation thereof.

Office Action from the Chinese Patent Office dispatched Dec. 25, 2020 in related CN application No. 201880032003, and translation thereof.

Office Action from the Japanese Patent Office dispatched Jan. 27, 2021 in related JP application No. 2017-098335, and translation thereof.

English translation of International Preliminary Report on Patentability for parent application No. PCT/JP2018/018423 dated Nov. 17, 2019.

Office Action from the Chinese Patent Office dated Jun. 25, 2021 in counterpart application No. 201880032003.X, and translation thereof.

TOOL HOLDER

CROSS-REFERENCE

This application is the US national stage of International patent application no. PCT/JP2018/018423 filed on May 11, 2018, which claims priority to Japanese patent application no. 2017-098335 filed on May 17, 2017.

TECHNICAL FIELD

The present invention relates to a tool holder for holding a tool, and more particularly to a tool holder capable of suitably holding a tap that is used for a tapping operation.

BACKGROUND ART

When performing a tapping operation that forms an internal thread in a work (workpiece), a tap is gripped by a tool gripping portion of a tool holder (referred to as a "tap holder") which is mounted onto a spindle of a machine tool. In this case, when the tapping operation is being performed using the tap, excessive stress may be applied to a cutting edge of the tap owing to cutting resistance, etc. If excessive stress is applied to the cutting edge of the tap, the machining accuracy of the internal thread may be reduced.

Therefore, a tool holder is provided which has a stress absorbing mechanism that absorbs stress applied to the cutting edge of the tap. Tool holders having a stress absorbing mechanism are disclosed, for example, in Patent Documents 1 and 2. The tool holder disclosed in Patent Document 1 has a first stress absorbing mechanism which absorbs stress applied to the tool gripping portion in one direction of an axial direction and a second stress absorbing mechanism which absorbs stress applied to the tool gripping portion in the other direction of the axial direction. Further, the tool holder disclosed in Patent Document 2 has a single stress absorbing mechanism configured to absorb stress applied to the tool gripping portion in the one direction and the other direction of the axial direction.

PRIOR ART DOCUMENTS

Patent Documents

Patent Document 1: Japanese Unexamined Patent Application Publication No. 2012-11474
Patent Document 2: Japanese Unexamined Patent Application Publication No. 2002-46020

SUMMARY OF THE INVENTION

The tool holder disclosed in Patent Document 1 is configured such that stress applied to the tool gripping portion in the one direction of the axial direction is absorbed by the first stress absorbing mechanism and stress applied thereto in the other direction of the axial direction is absorbed by the second stress absorbing mechanism. Further, the tool holder disclosed in Patent Document 2 is configured such that stress applied to the tool gripping portion in the one direction and the other direction of the axial direction are absorbed by the single stress absorbing mechanism. Therefore, the structures are complicated.

The present invention has been made in view of these points and it is an object of the present invention to provide a tool holder that can absorb stress applied to a tool by using a simple structure.

A tool holder of the present invention comprises a body having a body inner peripheral surface and a body outer peripheral surface. The body has a shank portion on a rear end side and a tool gripping portion on a front end side. The shank portion is gripped by a gripping mechanism provided on a spindle of a machine tool. Typically, the portion of the body outer peripheral surface that corresponds to the shank portion is gripped by the gripping mechanism of the machine tool. The tool gripping portion is configured to grip a tool. Typically, an outer peripheral surface of a tool shank portion of the tool is inserted into a portion (tool insertion space) of a body internal space, which is defined by the portion of the body inner peripheral surface that corresponds to the tool gripping portion, and is gripped by this portion of the body inner peripheral surface.

The body has a first elastic portion between the shank portion and the tool gripping portion. The first elastic portion has a plurality of first voids and a plurality of second voids that extend between the body inner peripheral surface (the portion of the body inner peripheral surface that corresponds to the first elastic portion) and the body outer peripheral surface (the portion of the body outer peripheral surface that corresponds to the first elastic portion), and is configured to be elastically deformable along an axial direction and around a circumferential direction. The structure of "being elastically deformable along the axial direction and around the circumferential direction" refers to a structure that is elastically deformable along the axial direction and around the circumferential direction so as to absorb stress applied to the tool gripping portion in the axial direction and in the circumferential direction during operation using the tool.

A first void extends around the circumferential direction (including "substantially around the circumferential direction") so as to at least partially overlap with at least one other first void in the circumferential direction. Further, a second void extends along the axial direction (including "substantially along the axial direction") so as to at least partially overlap with at least one other second void in the axial direction.

A variety of numbers, shapes (widths, sections, lengths) and arrangement positions of the first voids and the second voids may be selected within a range in which the first elastic portion can elastically deform along the axial direction and around the circumferential direction.

In the present invention, stress applied to the tool gripping portion during operation is absorbed by a simple structure.

In a different aspect of the present invention, at least one of the first voids and at least one of the second voids are continuous with each other.

In this aspect, the first voids and the second voids, which extend between the body inner peripheral surface (the portion of the body inner peripheral surface that corresponds to the first elastic portion) and the body outer peripheral surface (the portion of the body outer peripheral surface that corresponds to the first elastic portion), can be easily formed. In particular, in case the voids will be formed by using a wire-cut machining method, a plurality of voids can be easily formed in a short time.

In a different aspect of the present invention, the plurality of first voids and the plurality of second voids are divided into a plurality of void groups that include the first voids and the second voids. The numbers of the first voids and the second voids included in the void group are preferably set to be equal to each other, but may be different from each other. A void group is arranged so as to at least partially overlap with at least one of the other void groups in the circumferential direction and the axial direction. The plurality of void groups is preferably arranged around the circumferential direction.

In this aspect, the first elastic portion can be formed more easily.

In a different aspect of the present invention, although the plurality of void groups includes the same number of first void groups and second void groups, the arrangement shapes of the first voids and the second voids differ between the first and second void groups. The first void groups and the second void groups are alternately arranged around the circumferential direction.

Preferably, the first voids and the second voids included in the first void group are formed to be continuous with each other and the first voids and the second voids included in the second void group are also formed with be continuous to each other.

Further, the arrangement shape of the first voids and the second voids included in the first void group and the arrangement shape of the first voids and the second voids included in the second void group are preferably set to be point-symmetrical to each other.

In this aspect, the first elastic portion can be formed more easily.

In another aspect of the present invention, a first cylindrical member is arranged on an outer periphery side of the body and is movable along the axial direction in conjunction with elastic deformation of the first elastic portion along the axial direction. For example, the first cylindrical member is arranged on an outer periphery side of the first elastic portion so as to be movable along the axial direction, and a pin is inserted into a hole formed in the first cylindrical member and a hole formed in the body at a position on the front end side of the first elastic portion.

Further, a second elastic part is provided on the rear end side of the first cylindrical member and is elastically deformable in conjunction with axial movement of the first cylindrical member. For example, a stepped surface is formed at a position on the rear end side of the first elastic portion on the body outer peripheral surface, and the second elastic part is provided between the stepped surface of the body outer peripheral surface and a rear end surface of the first cylindrical member. For example, an O-ring can be used as the second elastic part.

In this aspect, the elastic properties (elastic contraction properties) of the first elastic portion that elastically deforms toward the rear end side along the axial direction can be set higher by the elastic properties of the second elastic part than the elastic properties (elastic elongation properties) of the first elastic portion that elastically deforms toward the front end side along the axial direction. Therefore, for example, stress caused by a difference (feed error) between the pitch of the tap and the feed rate of a machine is absorbed by the low elastic elongation properties. It is noted that, if the elastic elongation properties are high, a size reduction of the internal thread may be caused when absorbing a feed error. On the other hand, stress caused when the cutting edge of the tap bites into a workpiece is absorbed by the high elastic contraction properties. It is noted that, if the elastic contraction properties are low, the machining depth of the tap may become shallow when the cutting edge of the tap bites into a workpiece.

In another aspect of the present invention, a second cylindrical member is arranged on an inner periphery side of the body and is movable along the axial direction in conjunction with axial movement of a tool (a rear end portion of the tool) gripped by the tool gripping portion. For example, a position adjusting member that is abuttable on a rear end surface of the tool gripped by the tool gripping portion and the second cylindrical member threadably engaged with the position adjusting member are arranged on the inner periphery side of the body so as to be movable along the axial direction.

Further, a third elastic part is provided on the rear end side of the second cylindrical member and is elastically deformable in conjunction with axial movement of the second cylindrical member. For example, a stepped surface is formed at a position on the rear end side of the first elastic portion on the body inner peripheral surface, and the third elastic part is provided between the stepped surface of the body inner peripheral surface and a rear end surface of the second cylindrical member. For example, an O-ring can be used as the third elastic part.

In this aspect, the elastic properties (elastic contraction properties) of the first elastic portion that elastically deform toward the rear end side along the axial direction can be set higher by the elastic properties of the third elastic part than the elastic properties (elastic elongation property) of the first elastic portion that elastically deforms toward the front end side along the axial direction. Therefore, for example, stress caused by a difference (feed error) between the pitch of the tap and the feed rate of the machine is absorbed by the low elastic elongation properties. On the other hand, stress caused when the cutting edge of the tap bites into a workpiece is absorbed by the high elastic contraction properties.

In tool holders of the present invention, stress applied to the tool during operation can absorbed by a simple structure.

DETAILED DESCRIPTION

The following detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

In the following, an embodiment of a tool holder of the present invention will be described with reference to the drawings.

In this specification, the elongation direction (direction A shown in FIG. 1) of the rotational center line P of the body of the tool holder is defined as the "axial direction". Further, in a section orthogonal to the axial direction, the direction around a circular arc centered on the rotational center (rotational center line P) of the body is defined as the "rotational direction" or the "circumferential direction", and the direction of a line passing through the rotational center of the body is defined as a "radial direction". Moreover, along the axial direction, the side (right side in FIG. 1) where a tool is inserted is defined as the "front end side" and its opposite side (left side in FIG. 1) is defined as the "rear end side".

Figure 1:
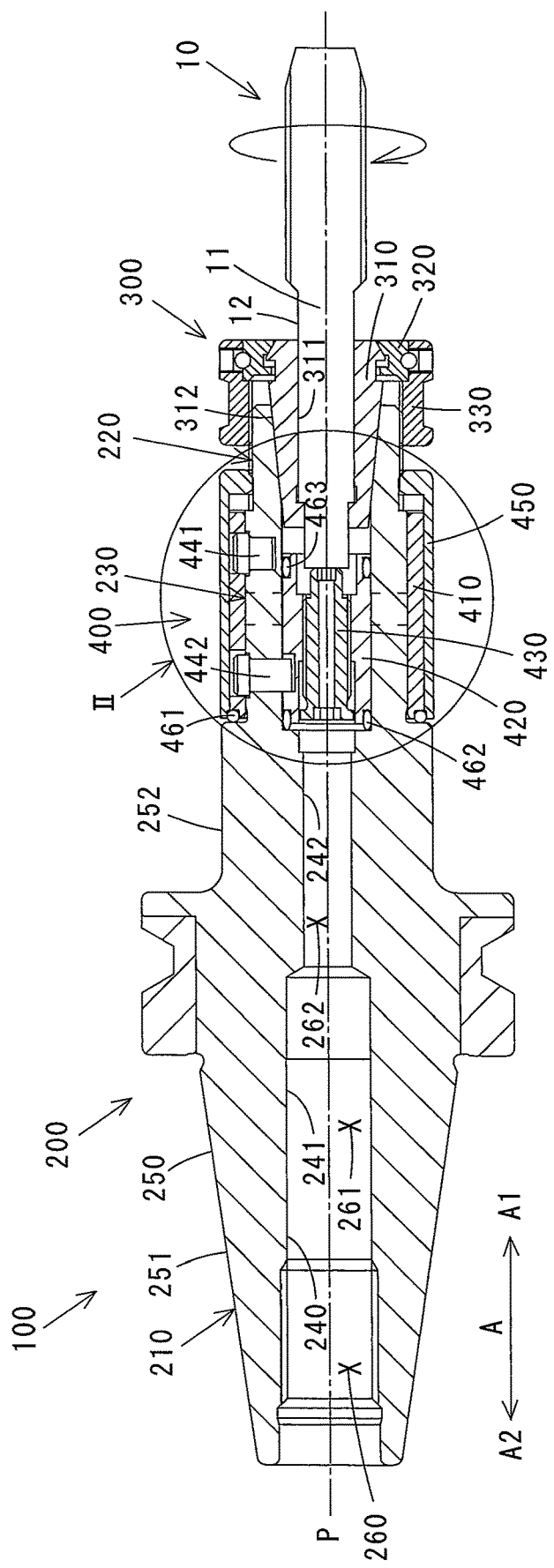
FIG. 1 is a sectional view of a tool holder according to a first embodiment of the present invention.
Figure 2:
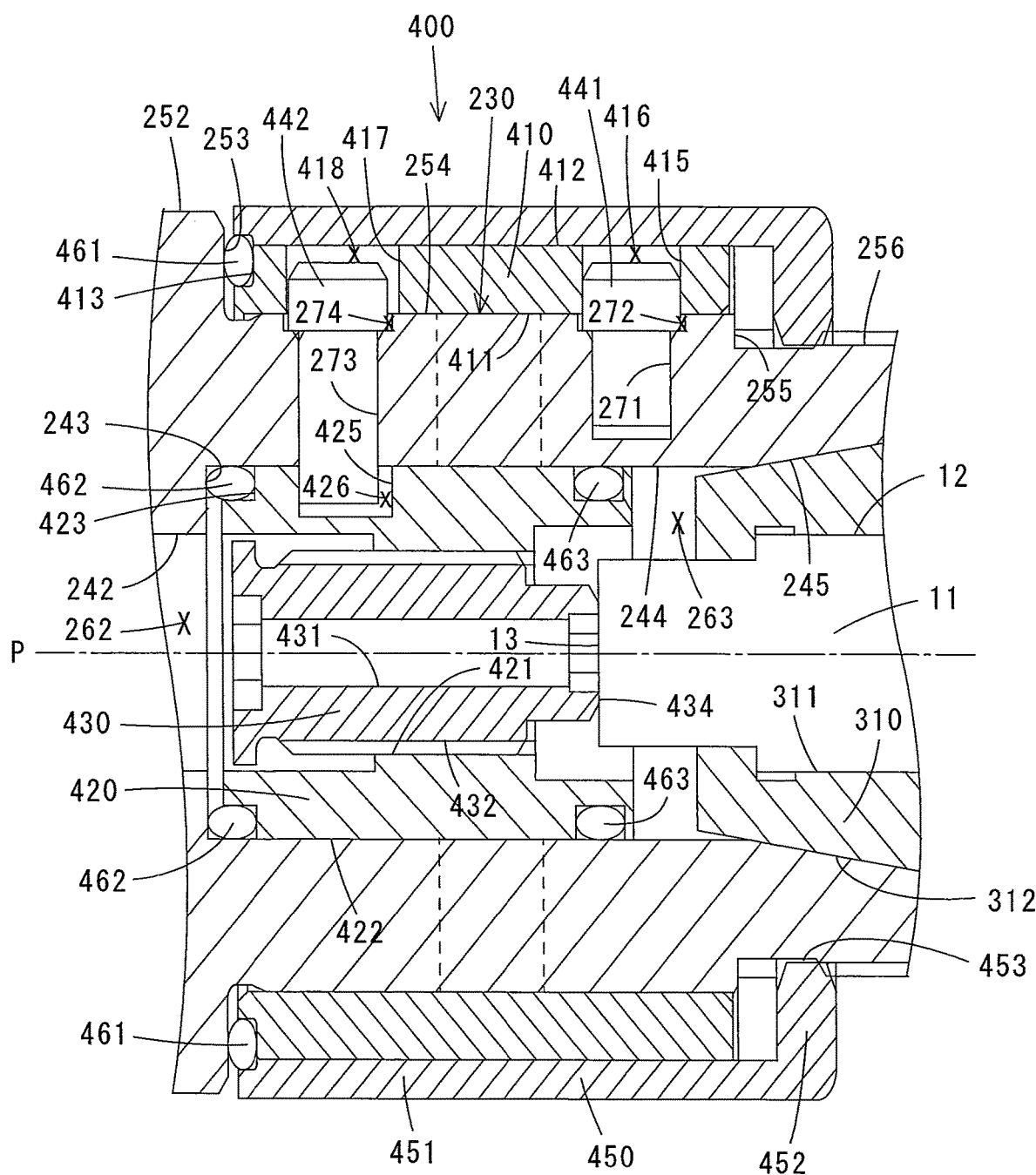
FIG. 2 is an enlarged view of the portion indicated by arrow II in FIG. 1.

A tool holder 100 of a first embodiment of the present invention will be described with reference to FIGS. 1 and 2. The tool holder 100 of the first embodiment is configured as a tap holder that holds a tap, which performs a tapping operation that forms an internal thread in a workpiece. It is noted that FIG. 1 is a sectional view of the tool holder 100 of the first embodiment, and FIG. 2 is an enlarged view of the portion of the tool holder 100 that is indicated by arrow II in FIG. 1.

The tool holder 100 of this embodiment has a body 200. In this embodiment, the body 200 is formed of steel.

The body 200 is formed in a cylindrical shape having a body inner peripheral surface 240 and a body outer peripheral surface 250.

The body inner peripheral surface 240 has first to fifth body inner peripheral surface portions 241 to 245. It is noted that the third body inner peripheral surface portion 243 is formed as a stepped surface connecting the second body inner peripheral surface portion 242 and the fourth body inner peripheral surface portion 244, which have different inner diameters.

The body outer peripheral surface 250 has first to sixth body outer peripheral surface portions 251 to 256. It is noted that the third body outer peripheral surface portion 253 is formed as a stepped surface connecting the second body outer peripheral surface portion 252 and the fourth body outer peripheral surface portion 254, which have different outer diameters; the fifth body outer peripheral surface portion 255 is formed as a stepped surface connecting the fourth body outer peripheral surface portion 254 and the sixth body outer peripheral surface portion 256, which have different outer diameters.

The body inner peripheral surface 240 defines a body interior space 260. A cooling medium (for example, cooling oil) that cools a tool 10, which is gripped by a tool gripping portion 220, flows through the body interior space 260. The body interior space 260 has a first body interior space portion 261, which is defined by the first body inner peripheral surface portion 241, a second body interior space portion 262, which is defined by the second body inner peripheral surface portion 242, and a third body interior space portion 263, which is defined by the third to fourth body inner peripheral surface portions 243 to 245. The third body interior space portion 263 forms a tool insertion space, into which a held portion 11 of the tool 10 is inserted.

The body 200 has a shank portion 210 on the rear end side, has the tool gripping portion 220 on the front end side, and has an elastic portion 230 between the shank portion 210 and the tool gripping portion 220.

The tool holder further has a tool gripping mechanism 300 that holds the tool 10 (hereinafter referred to as "tap 10") in cooperation with the tool gripping portion 220 of the body 200.

Furthermore, a stress absorbing mechanism 400 is provided that includes the elastic portion 230 of the body 200 and absorbs stress applied to a cutting edge of the tap 10 during a tapping operation, i.e. stress applied to the tool gripping portion 220 holding the tap 10 (stress in the axial direction and stress in the rotational direction).

The elastic portion 230 corresponds to a "first elastic portion" of the present invention.

The body outer peripheral surface portion (the first body outer peripheral surface portion 251) corresponding to the shank portion 210 is formed in a tapered shape. The first body outer peripheral surface portion 251 is gripped by a gripping mechanism provided on a spindle of a machine tool, so that the shank portion 210 is coupled to the spindle of the machine tool. A variety of known gripping mechanisms can be used as the gripping mechanism that grips the first body outer peripheral surface portion 251 (the shank portion 210).

The tool gripping portion 220 grips the tap 10 in cooperation with the tool gripping mechanism 300.

A spiral cutting edge is formed with a prescribed pitch on a front end region of the tap 10. Further, the held portion 11 having a held surface 12 on its outer periphery is provided along the rear end region of the tap 10.

The tool gripping mechanism 300 includes a collet 310, an engagement member 320 and a fastener 330.

The collet 310 is inserted into the third body interior space portion 263, which is defined by the body inner peripheral surface portion (the fifth body inner peripheral surface portion 245) corresponding to the tool gripping portion 220. The fifth body inner peripheral surface portion 245 and a collet outer peripheral surface 312 have respective tapered surfaces that are engageable with each other. The engagement member 320 is arranged on an outer periphery of a front end region of the collet 310. Further, a front end region of the fastener 330 is arranged on an outer periphery of the engagement member 320 and a rear end region of the fastener 330 is threadably engaged with the body outer peripheral surface portion (the sixth body outer peripheral surface portion 256) corresponding to the tool gripping portion 220. The held portion 11 of the tap 10 is inserted through a hole formed in the collet 310.

When the fastener 330 is rotated in this state, the fastener 330, the engagement member 320 and the collet 310 move in a front-rear direction (the axial direction). When the collet 310 moves toward the rear end side, the held surface 12 of the held portion 11 of the tap 10 is gripped by the engagement of the tapered surface of the fifth body inner peripheral surface portion 245 with the tapered surface of the collet outer peripheral surface 312 of the collet 310. Specifically, the tap 10 is gripped by the tool gripping portion 220. On the other hand, when the collet 310 moves toward front end side, the gripping of the tap 10 is released.

The elastic portion 230 is configured to be elastically deformable around the circumferential direction and along the axial direction, thereby absorbing stresses applied to the cutting edge of the tap 10 in the circumferential direction and in the axial direction when a tapping operation is performed using the tap 10.

Figure 3:
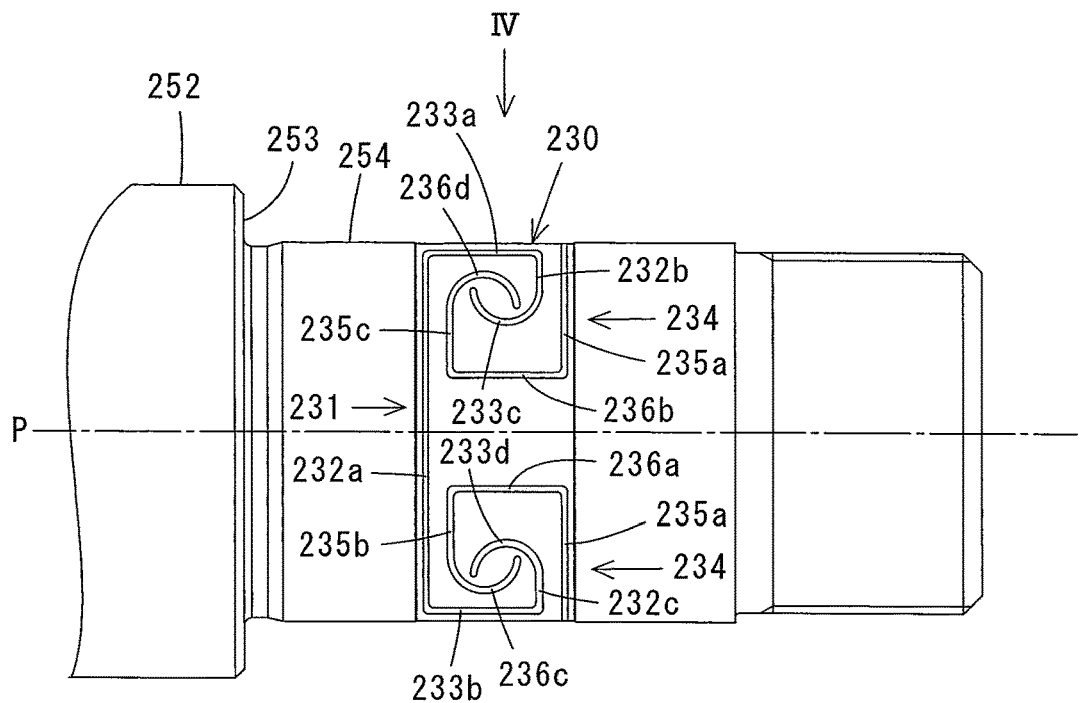
FIG. 3 shows an elastic portion of the tool holder of the first embodiment.
Figure 4:
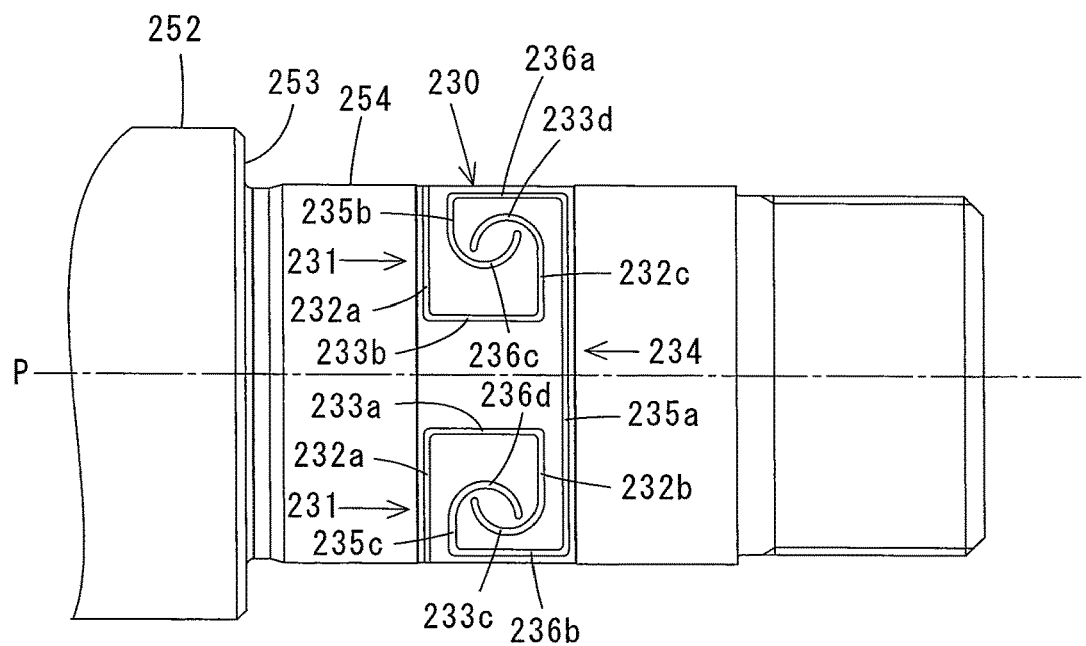
FIG. 4 shows a view from the direction of arrow IV in FIG. 3.

The elastic portion 230 of this embodiment will be described with reference to FIGS. 3 and 4. FIG. 3 shows the elastic portion 230 as viewed from its outer periphery side and FIG. 4 shows the elastic portion 230 as viewed from the direction of arrow IV in FIG. 3.

The elastic portion 230 has a plurality of voids extending between the body inner peripheral surface portion (the fourth body inner peripheral surface portion 244) and the body outer peripheral surface portion (the fourth body outer peripheral surface portion 254), which correspond to the elastic portion 230.

In this embodiment, the plurality of voids formed in the elastic portion 230 include a plurality of first voids extending around the circumferential direction and a plurality of second voids extending along the axial direction. The "first voids extending around the circumferential direction" include a void or voids extending substantially around the circumferential direction and the "second voids extending along the axial direction" include a void or voids extending substantially along the axial direction.

The first void(s) extending around the circumferential direction is (are) configured to at least partially overlap with at least one other first void around the circumferential direction. Further, the second void(s) extending along the axial direction is (are) configured to at least partially overlap with at least one other second void along the axial direction.

Further, the plurality of the first voids and the plurality of the second voids are divisible into a plurality of void groups that include the first voids and the second voids.

In this embodiment, the first voids and the second voids are divided into first void groups 231, which include first voids 232a to 232c extending around the circumferential direction and second voids 233a to 233d extending along the axial direction, and second void groups 234, which include first voids 235a to 235c extending around the circumferential direction and second voids 236a to 236d extending along the axial direction. Further, in this embodiment, the first voids and the second voids are divided into two such first void groups 231 and two such second void groups 234.

The voids that extend between the body inner peripheral surface 240 (the fourth body inner peripheral surface portion 244) and the body outer peripheral surface 250 (the fourth body outer peripheral surface portion 254) are formed, for example, by a wire-cut machining method. In case a void will be formed using the wire-cut machining method, a start hole needs to be formed. Specifically, in order to individually form the plurality of voids using the wire-cut machining method, a start hole needs to be formed for each void.

When the first voids and the second voids will be formed using the wire-cut machining method, it is preferable that at least one of the first voids and at least one of the second voids are formed to be continuous with each other, in order to be able to perform the wire-cut machining method easily in a short time.

In this embodiment, the first voids 232a to 232c and the second voids 233a to 233d included in the first void group 231 are formed to be continuous with each other.

Specifically, the second void 233a extends toward the front end side along the axial direction from an end on one side (upper side as viewed in FIG. 3) in the circumferential direction of the first void 232a that extends around the circumferential direction, and the second void 233b extends toward the front end side along the axial direction from an end on the other side (lower side as viewed in FIG. 3) in the circumferential direction of the first void 232a. The first void 232b extends to the other side in the circumferential direction around the circumferential direction from a front end of the second void 233a, and the second void 233c extends toward the rear end side along the axial direction from an end on the other side in the circumferential direction of the first void 232b. Further, the first void 232c extends to the one side in the circumferential direction around the circumferential direction from a front end of the second void 233b, and the second void 233d extends toward the rear end side along the axial direction from an end on the one side in the circumferential direction of the first void 232c. In this embodiment, the first voids 232a to 232c and the second voids 233a, 233b have a straight shape, the second void 233c has a curved shape (for example, a circular arc shape) protruding toward the other side in the circumferential direction and the second void 233d has a curved shape (for example, a circular arc shape) protruding toward the one side in the circumferential direction.

Similarly, the first voids 235a to 235c and the second voids 236a to 236d included in the second void group 234 are formed to be continuous with each other.

Specifically, the second void 236a extends toward the rear end side along the axial direction from an end on one side (upper side as viewed in FIG. 4) in the circumferential direction of the first void 235a that extends around the circumferential direction, and the second void 236b extends toward the rear end side along the axial direction from an end on the other side (lower side as viewed in FIG. 4) in the circumferential direction of the first void 235a. The first void 235b extends to the other side in the circumferential direction around the circumferential direction from a rear end of the second void 236a, and the second void 236c extends toward the front end side along the axial direction from an end on the other side in the circumferential direction of the first void 235b. Further, the first void 235c extends to the one side in the circumferential direction around the circumferential direction from a rear end of the second void 236b, and the second void 236d extends toward the front end side along the axial direction from an end on the one side in the circumferential direction of the first void 235c. In this embodiment, the first voids 235a to 235c and the second voids 236a, 236b have a straight shape, the second void 236c has a curved shape (for example, the circular arc shape) protruding toward the other side in the circumferential direction and the second void 236d has a curved shape (for example, a circular arc shape) protruding toward the one side in the circumferential direction.

In this embodiment, the arrangement shape around the circumferential direction of the first voids 232a to 232c and the second voids 233a to 233d included in the first void group 231 and the arrangement shape around the circumferential direction of the first voids 235a to 235c and the second voids 236a to 236d included in the second void group 234 are set so as to be point-symmetrical to each other. Specifically, the arrangement shape around the circumferential direction of the voids included in the first void group 231 and the arrangement shape around the circumferential direction of the voids included in the second void group 234 are set so as to match each other if either one is rotated 180 degrees.

Void groups (the first void group 231, the second void group 234) are configured such that each void group at least partially overlaps with at least one of the other void groups around the circumferential direction and along the axial direction.

In this embodiment, the first void groups 231 and the second void groups 234 are alternately arranged around the circumferential direction, and the first void group 231 and the second void group 234 that are adjacent to each other in the circumferential direction are arranged to partially overlap with each other in the circumferential direction and in the axial direction.

Specifically, it is configured such that the second void 233c included in the first void group 231 is arranged between the second voids 236b and 236d included in the second void group 234 that is adjacent to the first void group 231 on the one side in the circumferential direction, and the second void 236c included in the first void group 231 is arranged between the second voids 236a and 236c included in the second void group 234 that is adjacent to the first void group 231 on the other side in the circumferential direction. Further, it is configured such that the second void 236c included in the second void group 234 is arranged between the second voids 233b and 233d included in the first void group 231 that is adjacent to the second void group 234 on the one side in the circumferential direction, and the second void 236d included in the second void group 234 is arranged between the second voids 233a and 233c included in the first void group 231 that is adjacent to the second void group 234 on the other side in the circumferential direction.

When stress is applied to the tap 10 in the axial direction or in the rotational direction while a tapping operation that forms an internal thread in a workpiece is being performed by using the tap 10, stress is also applied to the tool gripping portion 220 in the axial direction or in the rotational direction. This stress is also applied to the elastic portion 230 connected to the tool gripping portion 220. For example, the stress is applied toward the rear end side from the front end side along the axial direction, or the stress is applied in a direction opposite to the direction of rotation of the tap 10 along the rotational direction.

In this embodiment, the elastic portion 230 is configured to be elastically deformable along the axial direction and around the circumferential direction.

Therefore, for example, when stress is applied to the elastic portion 230 in direction A2 along the axial direction, the elastic portion 230 elastically deforms (contracts) in direction A2 along the axial direction. As a result, stress in direction A2 along the axial direction is absorbed. When stress in direction A2 along the axial direction decreases, the elastically deformed elastic portion 230 returns (elongates) to its original shape.

In addition, when stress is applied to the elastic portion 230 around the circumferential direction via the tool gripping portion 220, the elastic portion 230 elastically deforms around the circumferential direction. As a result, stress around the circumferential direction is absorbed. When stress around the circumferential direction decreases, the elastically deformed elastic portion 230 returns to its original shape.

Further, when stress is applied to the elastic portion 230 in direction A2 along the axial direction and in the circumferential direction, the elastic portion 230 elastically deforms in direction A2 along the axial direction and also elastically deforms around the circumferential direction (elastically deforms into a twisted shape). As a result, stress in direction A2 along the axial direction and stress around the circumferential direction are absorbed. When stress in direction A2 along the axial direction and stress around the circumferential direction decrease, the elastically deformed elastic portion 230 returns to its original shape.

When a tapping operation is being performed, stress is applied to the tap owing to a difference (referred to as a "feed error") between the pitch of the tap and the feed rate of the machine or owing to biting of the cutting edge of the tap into the workpiece. Stress caused by a feed error can be absorbed by elastic elongation deformation of the elastic portion 230, and stress caused by biting of the cutting edge of the tap into the workpiece can be absorbed by elastic contraction deformation of the elastic portion 230.

When stress caused by a feed error is absorbed owing to the elastic elongation properties of the elastic portion 230, because a size reduction of the internal thread may be caused if the elastic portion 230 has high elastic elongation properties, the elastic elongation properties of the elastic portion 230 are preferably set low. On the other hand, when stress caused by biting of the cutting edge of the tap into the workpiece is absorbed owing to the elastic contraction properties of the elastic portion 230, because the machining depth may become shallow if the elastic portion 230 has low elastic contraction properties, the elastic contraction properties of the elastic portion 230 are preferably set high.

The high elastic contraction properties and the low elastic elongation properties cannot be set by only the elastic portion 230.

Therefore, in this embodiment, the stress absorbing mechanism 400 is provided which is capable of setting the elastic elongation properties appropriate to absorb stress caused by a feed error and the elastic contraction properties appropriate to absorb stress caused by biting of the cutting edge of the tap into the workpiece, while using the elastic portion 230 that can absorb stress in the axial direction and in the circumferential direction by using a simple structure.

The stress absorbing mechanism 400 of this embodiment includes the elastic portion 230, as well as a collar 410, a support member 420, a position adjusting member 430 and O-rings 461, 462 for adjusting the elastic properties of the elastic portion 230.

It is noted that the body inner peripheral surface portion (the fourth body inner peripheral surface portion 244) and the body outer peripheral surface portion (the fourth body outer peripheral surface portion 254), which correspond to the elastic portion 230, and the body outer peripheral surface portion (the sixth body outer peripheral surface portion 256), which corresponds to the tool gripping portion 220, have a circular shape centered on the center of rotation when viewed in a cross section orthogonal to the axial direction.

Further, the body 200 has a hole 272, which is defined by a hole wall surface 271 at a position on the front end side of the elastic portion 230 and opens to the fourth body outer peripheral surface portion 254, and a through hole 274, which is defined by a hole wall surface 273 at a position on the rear end side of the elastic portion 230.

The collar 410 is formed in a cylindrical shape having a collar inner peripheral surface 411 and a collar outer peripheral surface 412. The collar inner peripheral surface 411 and the collar outer peripheral surface 412 have a circular shape centered on the center of rotation when viewed in a cross section orthogonal to the axial direction. Further, the collar 410 has a through hole 416 defined by a hole wall surface 415 in its front end region and has a through hole 418 defined by a hole wall surface 417 in its rear end region.

The collar 410 is arranged on the outer periphery side of the fourth body outer peripheral surface portion 254. A pin 441 is inserted into the through hole 416 of the collar 410 and into the hole 272 of the body 200. Thus, the collar 410 is connected to the body 200 by the pin 441 at a position on the front end side of the elastic portion 230. Specifically, the collar 410 is movable along the fourth body outer peripheral surface portion 254 (along the axial direction) when the elastic portion 230 elastically deforms along the axial direction (in conjunction with elastic deformation of the elastic portion 230 along the axial direction).

It is noted that, if the inner diameter of the through hole 416 is set to be larger than the outer diameter of the pin 441, the timing at which the collar 410 moves along the axial direction in conjunction with the elastic deformation of the elastic portion 230 along the axial direction can be delayed according to the difference between the inner diameter of the through hole 416 and the outer diameter of the pin 441. Naturally, it can also be configured such that the collar 410 immediately moves along the axial direction in conjunction with the elastic deformation of the elastic portion 230 along the axial direction.

Further, the O-ring 461 is arranged between the third body outer peripheral surface portion (stepped surface) 253 and a rear end surface 413 of the collar 410. The O-ring 461 is formed of, for example, rubber so as to be elastically deformable at least along the axial direction.

It is noted that a cover 450 is arranged on the outer periphery side of the collar 410. The cover 450 has a bottomed cylindrical shape having a cylindrical portion 451 and a bottom 452. A hole is defined by a hole wall surface 453 in the center of the bottom 452. The cover 450 is mounted onto the body 200 by threadably engaging a thread formed on the hole wall surface 453 with a thread formed on the sixth body outer peripheral surface portion 256.

The collar 410 corresponds to a "first cylindrical member" of the present invention. Further, the O-ring 461 corresponds to a "second elastic part" of the present invention.

The support member 420 is formed in a cylindrical shape having a support member inner peripheral surface 421 and a support member outer peripheral surface 422. The support member inner peripheral surface 421 and the support member outer peripheral surface 422 have a circular shape centered on the center of rotation when viewed in a cross section orthogonal to the axial direction. Further, the support member 420 has a hole 426 that is defined by a hole wall surface 425 at a position in its rear end region and opens to the support member outer peripheral surface 422.

The support member 420 is arranged on the inner periphery side of the fourth body inner peripheral surface portion 244 (in the third body inside space portion 263 defined by the fourth body inner peripheral surface portion 244). A pin 442 is inserted into the through hole 418 of the collar 410, the through hole 274 of the body 200 and the hole 426 of the support member 420. The inner diameter of the hole 426 of the support member 420 is set to be larger than the outer diameter of the pin 422. With this structure, the support member 420 is movable relative to the pin 442 within a range of the difference between the inner diameter of the hole 426 and the outer diameter of the pin 422. When the hole wall surface 425 defining the hole 426 abuts on the pin 442, movement (movement along the axial direction, movement around the circumferential direction) of the support member 420 is blocked.

It is noted that the through hole 418 of the collar 410 is configured such that movement of the collar 410 along the axial direction is not prevented by abutment of the hole wall surface 417 defining the through hole 418 with the outer peripheral surface of the pin 442.

Further, the O-ring 462 is disposed between the third body inner peripheral surface portion (stepped surface) 243 and a rear end surface 423 of the support member 420. The O-ring 462 is formed of, for example, rubber so as to be elastically deformable at least along the axial direction.

In addition, an O-ring 463 is disposed between the fourth body inner peripheral surface portion 244 and the support member outer peripheral surface 422.

It is noted that the O-ring 462 is also disposed between the fourth body inner peripheral surface portion 244 and the support member outer peripheral surface 422. Owing to the O-rings 462, 463, the cooling medium flowing through the body interior space 260 is prevented from leaking out through the voids formed in the elastic portion 230 and the through hole formed in the collar 410.

The position adjusting member 430 is formed in a cylindrical shape having a position adjusting member inner peripheral surface 431 and a position adjusting member outer peripheral surface 432. The position adjusting member inner peripheral surface 431 defines a position adjusting member interior space through which the cooling medium flows.

The position adjusting member 430 is mounted on the inner periphery side of the support member inner peripheral surface 421 by threadably engaging a thread formed on the support member inner peripheral surface 421 with a thread formed on the position adjusting member outer peripheral surface 432. The position of the position adjusting member 430 can be adjusted along the axial direction with respect to the support member 420 by rotating the position adjusting member 430 so as to adjust the position of the threaded engagement. The position of abutment of the rear end surface 13 of the tap 10 gripped by the tool gripping portion 220 with a front end surface 434 of the position adjusting member 430, or the position (protruding length) of the tap 10 along the axial direction is adjusted by adjusting the position of the position adjusting member 430 along the axial direction with respect to the support member 420.

With such a structure, when the tap 10 is moved along the axial direction by stress applied to the tap 10 (in conjunction with the axial movement of the rear end surface 13 of the tap 10) while the front end surface 434 of the position adjusting member 430 and the rear end surface 13 of the tap 10 are held in abutment with each other, the position adjusting member 430 and the support member 420 move along the axial direction.

It is noted that, if it is configured such that the front end surface 434 of the position adjusting member 430 and the rear end surface 13 of the tap 10 do not abut on each other, the position adjusting member 430 and the support member 420 do not move along the axial direction even when the tap 10 moves along the axial direction. Specifically, the function of adjusting the elastic contraction properties of the elastic portion 230 by the O-ring 462, which will be described below, is omitted.

The position adjusting member 430 corresponds to a "position adjusting member capable of adjusting a position of the tool along the axial direction" of the present invention. The support member 420 corresponds to a "second cylindrical member" of the present invention. The O-ring 462 corresponds to a "third elastic part" of the present invention.

Next, operation of the tool holder 100 of this embodiment will be described. In the following, the front end surface 434 of the position adjusting member 430 is held in abutment with the rear end surface 13 of the tap 10 (or the position of the tap 10 along the axial direction is adjusted by the position adjusting member 430).

The tap 10 is rotated while the held portion 11 of the tap 10 is gripped by the tool gripping portion 220.

When a tapping operation that forms an internal thread in a workpiece is performed by using the tap 10, if stress is applied to the tap 10 in the axial direction or in the rotational direction, stress in the axial direction or in the rotational direction is also applied to the tool gripping portion 220. This stress is also applied to the elastic portion 230 of the stress absorbing mechanism 400 that is connected to the tool gripping portion 220. As a result, the elastic portion 230 elastically deforms in the axial direction or the circumferential direction.

When the elastic portion 230 elastically deforms toward the rear end side (in the contracting direction) along the axial direction, the collar 410 connected to the body 200 by the pin 441 moves toward the rear end side along the axial direction, immediately or with a slight delay, in conjunction with the elastic deformation in the contracting direction.

When the collar 410 moves toward the rear end side along the axial direction, the O-ring 461 disposed on the rear end side of the collar 410 elastically deforms toward the rear end side along the axial direction.

Owing to the elastic deformation toward the rear end side of the O-ring 461 along the axial direction, the collar 410 is prevented from moving toward the rear end side along the axial direction, and furthermore the elastic portion 230 is prevented from elastically deforming toward the rear end side (in the contracting direction) along the axial direction. Specifically, the elastic contraction properties of the elastic portion 230 are substantially set high by the elastic properties of the O-ring 461.

On the other hand, when the elastic portion 230 elastically deforms toward the front end side along the axial direction, elastic deformation of the O-ring 461 has little influence. Specifically, the elastic elongation properties of the elastic portion 230 remain as it is.

When the tap 10 (the rear end surface 13 of the tap 10) moves toward the rear end side along the axial direction owing to elastic deformation toward the rear end side of the elastic portion 230 along the axial direction, the position adjusting member 430 and the support member 420, which is threadably engaged with the position adjusting member 430, also move toward the rear end side along the axial direction. Specifically, the position adjusting member 430 and the support member 420 move toward the rear end side along the axial direction in conjunction with the movement toward the rear end side of the tap 10 (tool) along the axial direction.

When the support member 420 moves toward the rear end side along the axial direction, the O-ring 462 elastically deforms toward the rear end side along the axial direction.

Owing to the elastic deformation toward the rear end side of the O-ring 462 along the axial direction, the support member 420 and the position adjusting member 430 are prevented from moving toward the rear end side along the axial direction, and furthermore the elastic portion 230 is prevented from elastically deforming toward the rear end side (in the contracting direction) along the axial direction. Specifically, the elastic contraction property of the elastic portion 230 is substantially set high by the elastic properties of the O-ring 462.

On the other hand, when the elastic portion 230 elastically deforms toward the front end side along the axial direction, elastic deformation of the O-ring 462 has little influence. Specifically, the elastic elongation properties of the elastic portion 230 remain as it is.

It is noted that, when the front end surface 434 of the position adjusting member 430 is not in abutment with the rear end surface 13 of the tap 10, the function of adjusting the elastic contraction property of the elastic portion 230 by the O-ring 462 does not operate.

Figure 5:
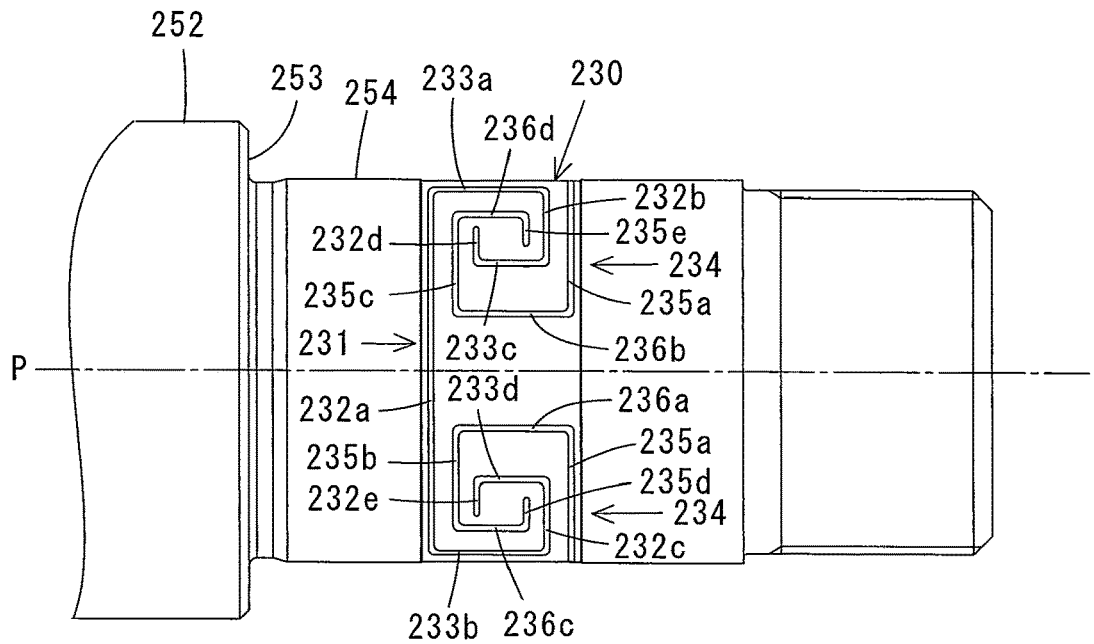
FIG. 5 shows an elastic portion of a tool holder of a second embodiment.

Next, an elastic portion 230 of a tool holder of a second embodiment will be described with reference to FIG. 5.

In the elastic portion 230 of this embodiment, the voids are divided into first void groups 231 which include first voids 232a to 232e extending around the circumferential direction and second voids 233a to 233d extending along the axial direction, and second void groups 234 which include first voids 235a to 235e extending around the circumferential direction and second voids 236a to 236d extending along the axial direction. Moreover, like in the first embodiment, the voids are divided into two such first void groups 231 and two such second void groups 234.

Further, the first voids 232a to 232e and the second voids 233a to 233d included in the first void group 231 are formed to be continuous with each other.

Specifically, the second void 233a extends toward the front end side along the axial direction from an end on one side (upper side as viewed in FIG. 5) of the first void 232a that extends around the circumferential direction, and the second void 233b extends toward the front end side along the axial direction from an end on the other side (lower side as viewed in FIG. 5) of the first void 232a. The first void 232b extends to the other side in the circumferential direction around the circumferential direction from an end on the front end side of the second void 233a, the second void 233c extends toward the rear end side along the axial direction from an end on the other side of the first void 232b in the circumferential direction, and the first void 232d extends to the one side in the circumferential direction around the circumferential direction from an end on the rear end side of the second void 233c. Further, the first void 232c extends to the one side in the circumferential direction around the circumferential direction from an end on the front end side of the second void 233b, the second void 233d extends toward the rear end side along the axial direction from an end on the one side of the first void 232c in the circumferential direction, and the first void 232e extends to the other side in the circumferential direction around the circumferential direction from an end on the rear end side of the second void 233d.

Similarly, the first voids 235a to 235e and the second voids 236a to 236d included in the second void group 234 are formed to be continuous to each other.

Specifically, the second void 236a extends toward the rear end side along the axial direction from an end on the one side in the circumferential direction of first void 235a, and the second void 236b extends toward the rear end side along the axial direction from an end on the other side in the circumferential direction of the first void 235a. The first void 235b extends to the other side in the circumferential direction around the circumferential direction from an end on the rear end side of the second void 236a, the second void 236c extends toward the front end side along the axial direction from an end on the other side in the circumferential direction of the first void 235b, and the first void 235d extends to the one side in the circumferential direction around the circumferential direction from an end on the front end side of the second void 236c. Further, the first void 235c extends to the one side in the circumferential direction around the circumferential direction from an end on the rear end side of the second void 236b, the second void 236d extends toward the front end side along the axial direction from an end on the one side in the circumferential direction of the first void 235c, and the first void 235e extends to the other side in the circumferential direction around the circumferential direction from an end on the front end side of the second void 236d.

In this embodiment, the first voids 232a to 232e, 235a to 235e and the second voids 233a to 233d, 236a to 236d have a straight shape.

The arrangement shape around the circumferential direction of the first voids 232a to 232e and the second voids 233a to 233d included in the first void group 231 and the arrangement shape around the circumferential direction of the first voids 235a to 235e and the second voids 236a to 236d included in the second void group 234 are set so as to be point-symmetrical to each other.

Further, the void groups are configured such that each void group at least partially overlaps with at least one of the other void groups around the circumferential direction and along the axial direction.

In this embodiment, the first void groups 231 and the second void groups 234 are alternately arranged around the circumferential direction, and the first void group 231 and the second void group 234 that are adjacent to each other in the circumferential direction are arranged to partially overlap with each other in the circumferential direction and in the axial direction.

Specifically, it is configured such that the first void 232d included in the first void group 231 is arranged between the first voids 235c and 235e included in the second void group 234, which is adjacent to the first void group 231 on the one side in the circumferential direction, and the first void 232e included in the first void group 231 is arranged between the first voids 235b and 235d included in the second void group 234, which is adjacent to the first void group 231 on the other side in the circumferential direction. Further, it is configured such that the first void 235d included in the second void group 234 is arranged between the first voids 232c and 232e included in the first void group 231, which is adjacent to the second void group 234 on the one side in the circumferential direction, and the first void 235e included in the second void group 234 is arranged between the first voids 232b and 232d included in the first void group 231, which is adjacent to the second void group 234 on the other side in the circumferential direction.

Figure 6:
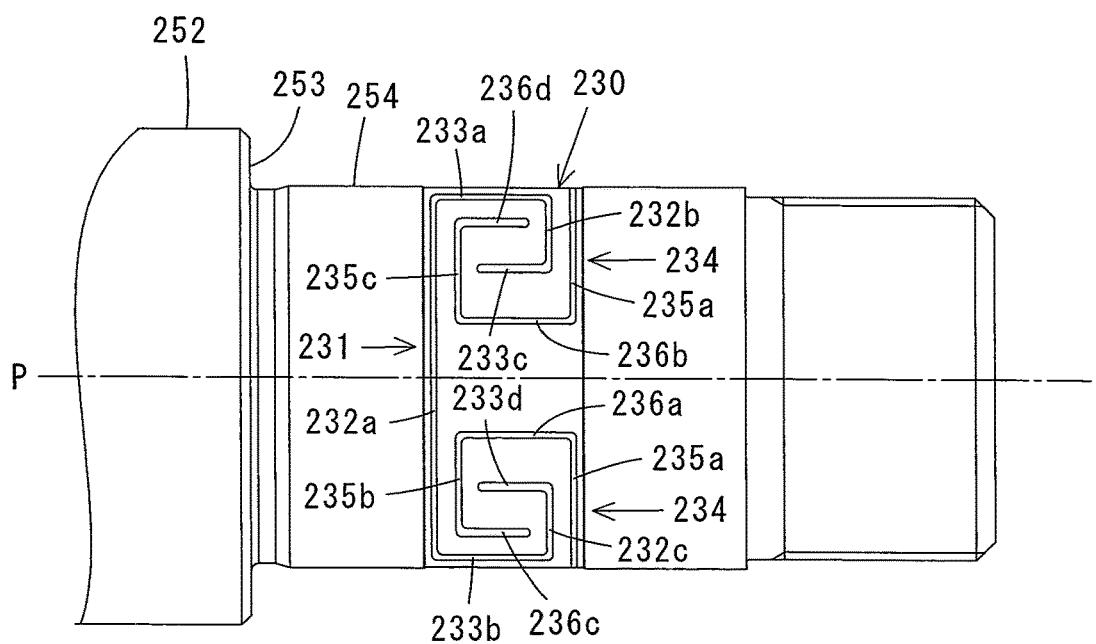
FIG. 6 shows an elastic portion of a tool holder of a third embodiment.

Next, an elastic portion 230 of a tool holder of a third embodiment will be described with reference to FIG. 6.

In the elastic portion 230 of this embodiment, the voids are divided into first void groups 231 which include first voids 232a to 232c extending around the circumferential direction and second voids 233a to 233d extending along the axial direction, and second void groups 234 which include first voids 235a to 235c extending around the circumferential direction and second voids 236a to 236d extending along the axial direction. Moreover, like in the first embodiment, the voids are divided into two such first void groups 231 and two such second void groups 234.

Further, the first voids 232a to 232c and the second voids 233a to 233d included in the first void group 231 are formed to be continuous with each other.

Specifically, the second void 233a extends toward the front end side along the axial direction from an end on one side (upper side as viewed in FIG. 6) in the circumferential direction of the first void 232a that extends around the circumferential direction, and the second void 233b extends toward the front end side along the axial direction from an end on the other side (lower side as viewed in FIG. 6) in the circumferential direction of the first void 232a. The first void 232b extends to the other side in the circumferential direction around the circumferential direction from an end on the front end side of the second void 233a, and the second void 233c extends toward the rear end side along the axial direction from an end on the other side in the circumferential direction of the first void 232b. Further, the first void 232c extends to the one side in the circumferential direction around the circumferential direction from an end on the front end side of the second void 233b, and the second void 233d extends toward the rear end side along the axial direction from an end on the one side in the circumferential direction of the first void 232c.

Similarly, the first voids 235a to 235c and the second voids 236a to 236d included in the second void group 234 are formed to be continuous with each other.

Specifically, the second void 236a extends toward the rear end side along the axial direction from an end on the one side in the circumferential direction of the first void 235a extending around the circumferential direction, and the second void 236b extends toward the rear end side along the axial direction from an end on the other side in the circumferential direction of the first void 235a. The first void 235b extends to the other side in the circumferential direction around the circumferential direction from an end on the rear end side of the second void 236a, and the second void 236c extends toward the front end side along the axial direction from an end on the other side in the circumferential direction of the first void 235b. Further, the first void 235c extends to the one side in the circumferential direction around the circumferential direction from an end on the rear end side of the second void 236b, and the second void 236d extends toward the front end side along the axial direction from an end on the one side in the circumferential direction of the first void 235c.

Further, in this embodiment, the first voids 232a to 232c, 235a to 235c and the second voids 233a to 233d, 236a to 236d have a straight shape.

The arrangement shape around the circumferential direction of the first voids 232a to 232c and the second voids 233a to 233d included in the first void group 231 and the arrangement shape around the circumferential direction of the first voids 235a to 235c and the second voids 236a to 236d included in the second void group 234 are set so as to be point-symmetrical to each other.

Further, the void groups are configured such that each void group at least partially overlaps with at least one of the other void groups around the circumferential direction and along the axial direction.

In this embodiment, the first void groups 231 and the second void groups 234 are alternately arranged around the circumferential direction, and the first void group 231 and the second void group 234 that are adjacent to each other in the circumferential direction are arranged to partially overlap with each other in the circumferential direction and in the axial direction.

Specifically, it is configured such that the second void 233c included in the first void group 231 is arranged between the second voids 236b and 236d included in the second void group 234, which is adjacent to the first void group 231 on the one side in the circumferential direction, and the second void 233d included in the first void group 231 is arranged between the second voids 236a and 236c included in the second void group 234, which is adjacent to the first void group 231 on the other side in the circumferential direction. Further, it is configured such that the second void 236c included in the second void group 234 is arranged between the second voids 233b and 233d included in the first void group 231, which is adjacent to the second void group 234 on the one side in the circumferential direction, and the second void 236d included in the second void group 234 is arranged between the second voids 233a and 233c included in the first void group 231, which is adjacent to the second void group 234 on the other side in the circumferential direction.

As described above, in the first to third embodiments, elastic portions 230 (first elastic portions) having simple structures absorb stress that is applied to the tap 10 in the axial direction and in the circumferential direction during a tapping operation.

Further, the elastic deformation toward the rear end side (elastic contraction properties) of the elastic portions 230 (first elastic portions) along the axial direction is adjusted by the O-ring 461 (second elastic part), which is elastically deformed toward the rear end side along the axial direction in conjunction with the elastic deformation toward the rear end side of the elastic portions 230 (first elastic portions) along the axial direction, and by the O-ring 462 (third elastic part), which is elastically deformed toward the rear end side along the axial direction in conjunction with the movement toward the rear end side of the tool (the rear end surface of the tool) gripped by the tool gripping portion along the axial direction. Specifically, the elastic contraction properties and the elastic elongation properties of the elastic portions 230 (first elastic portions) are properly set, so that stress caused by a feed error and stress caused by biting of the cutting edge of the tap into the workpiece are effectively absorbed without reducing the machining accuracy.

The present invention is not limited to the structures of the above-described embodiments, but rather, may be added to, changed, replaced with alternatives or otherwise modified.

The first voids extending around the circumferential direction include voids extending substantially around the circumferential direction, and the second voids extending along the axial direction include voids extending substantially along the axial direction.

Although voids are formed in the first elastic portions (elastic portions 230) such that the first voids extending around the circumferential direction and the second voids extending along the axial direction are continuous with each other, the first and second voids may be separately formed.

Although the first voids extending around the circumferential direction and the second voids extending along the axial direction are divided into a plurality of void groups including the first voids and the second voids, and are arranged, group by group, in the first elastic portions (elastic portions 230), they may be arranged, void by void, in the first elastic portion.

The numbers, shapes and arrangement positions of the first voids extending around the circumferential direction and the second voids extending along the axial direction may be appropriately changed within a range in which the first elastic portions (elastic portions 230) can elastically deform around the circumferential direction and along the axial direction.

The voids formed in the first elastic portions (elastic portions 230) are not limited to the first voids extending around the circumferential direction and the second voids extending along the axial direction, but may be appropriately changed within a range in which the first elastic portion can elastically deform around the circumferential direction and along the axial direction. For example, voids extending in a direction crossing the axial direction and the circumferential direction along the body outer peripheral surface may also be formed in the first elastic portions. Although an O-ring is used as the second elastic part that is provided on the rear end side of the first cylindrical member (collar 410) and is elastically deformable in conjunction with axial movement of the first cylindrical member, a variety of elastic members other than an O-ring may be used as the second elastic part.

Although an O-ring is used as the third elastic part that is provided on the rear end side of the second cylindrical member (support member 420) and is elastically deformable in conjunction with axial movement of the rear end portion of the tool, a variety of elastic members other than the O-ring may be used as the third elastic part.

Although the first elastic portion and the second elastic part are provided, one or both of the first elastic portion and the second elastic part may be omitted.

Although the tool holder of the present invention is suitably used to hold a tap that forms an internal thread in a workpiece, it may be used to hold a variety of tools other than a tap.

Each of the features or structures described in the embodiments may be used individually or in combination of appropriately selected ones.

The present invention can be configured as (Aspect 1):

"a tool holder, comprising a body that has a body inner peripheral surface and a body outer peripheral surface, the body having a shank portion on a rear end side and a tool gripping portion on a front end side, wherein:

the body has a first elastic portion between the shank portion and the tool gripping portion, and the first elastic portion has a plurality of voids extending between the body inner peripheral surface and the body outer peripheral surface and is configured to be elastically deformable along an axial direction and around a circumferential direction, the tool holder comprises:

a first cylindrical member that is arranged on an outer periphery side of the body and is movable along the axial direction in conjunction with elastic deformation of the first elastic portion along the axial direction, and a second elastic part that is arranged on the rear end side of the first cylindrical member and is elastically deformable in conjunction with axial movement of the first cylindrical member".

Further, the present invention can be configured as (Aspect 2):

"the tool holder as defined in Aspect 1, comprising:

a second cylindrical member that is arranged on an inner periphery side of the body and is movable along the axial direction in conjunction with axial movement of a rear end portion of a tool gripped by the tool gripping portion, and a third elastic part that is arranged on the rear end side of the second cylindrical member and is elastically deformable in conjunction with axial movement of the second cylindrical member".

In the tool holders of Aspects 1 and 2, the elastic properties (elastic contraction properties) of the first elastic portion that elastically deforms toward the rear end side along the axial direction can be set higher by the elastic properties of the second elastic part or the elastic properties of the second and third elastic parts than the elastic properties (elastic elongation properties) of the first elastic portion that elastically deforms toward the front end side along the axial direction. Therefore, for example, stress caused by a difference between the pitch of the tap and the feed rate of a machine is absorbed by the low elastic contraction properties, so that a size reduction of the internal thread can be prevented. Furthermore, stress caused when the cutting edge of the tap bites into a workpiece is absorbed by the high elastic elongation properties, so that the machining depth of the tap can be prevented from becoming shallow.

EXPLANATION OF THE SYMBOLS

10: tool
11: held portion
12: held surface
13: tool end surface
100: tool holder
200: body
210: shank portion
220: tool gripping portion
230: elastic portion (first elastic portion)
231: first void group
232a, 232b, 232c, 232d, 232e: first voids
233a, 233b, 233c, 233d: second voids
234: second void group
235a, 235b, 235c, 235d, 235e: first voids
236a, 236b, 236c, 236d: second voids
240: body inner peripheral surface 241 to 245: first to fifth body inner peripheral surface portions
250: body outer peripheral surface
251 to 256: first to sixth body outer peripheral surface portions
260: body interior space
261 to 263: first to third body interior space portions
271: hole wall surface
272: hole
273: hole wall surface
274: through hole
300: tool gripping mechanism
310: collet
320: engagement member
330: fastener
400: stress absorbing mechanism
410: collar (first cylindrical member)
411: collar inner peripheral surface
412: collar outer peripheral surface
413: collar rear end surface
415, 417: hole wall surface
416, 418: through hole
420: support member (second cylindrical member)
421: support member inner peripheral surface
422: support member outer peripheral surface
423: support member rear end surface
425: hole wall surface
426: hole
430: position adjusting member
431: position adjusting member inner peripheral surface
432: position adjusting member outer peripheral surface
434: position adjusting member front end surface
441, 442: pin
450: cover
451: cylindrical portion
452: bottom
453: hole wall surface
461: O-ring (second elastic part)
462: O-ring (third elastic part)
463: O-ring

The invention claimed is:

1. A tool holder, comprising:
a body having a body inner peripheral surface, a body outer peripheral surface, a shank portion on a first end side, a tool gripping portion on a second end side that is opposite of the first end side in an axial direction of the body, and a first elastic portion interposed between the shank portion and the tool gripping portion in the axial direction of the body;
a second cylindrical member that is arranged on an inner periphery side of the body and is configured to move along the axial direction in conjunction with axial movement of an end portion of a tool gripped by the tool gripping portion; and
a second elastic member that is arranged on an end side of the second cylindrical member closest to the tool gripping portion and is elastically deformable in conjunction with axial movement of the second cylindrical member;
wherein:
a plurality of first voids and a plurality of second voids are defined within the first elastic portion between the body inner peripheral surface and the body outer peripheral surface such that the first elastic portion is configured to be elastically deformable along the axial direction and around a circumferential direction of the body,
at least one of the first voids extends around the circumferential direction so as to at least partially overlap with at least one other first void in the circumferential direction, and
at least one of the second voids extends along the axial direction so as to at least partially overlap with at least one other second void in the axial direction.

2. The tool holder as defined in claim 1, wherein at least one of the first voids is continuous with at least one of the second voids.

3. The tool holder as defined in claim 2, wherein:
the plurality of first voids and the plurality of second voids are divided into a plurality of void groups that include the first voids and the second voids, and
at least one of the void groups is arranged so as to at least partially overlap with at least one other void group in the axial direction and in the circumferential direction.

4. The tool holder as defined in claim 3, wherein:
the plurality of void groups includes the same number of first void groups and second void groups,
the first voids and the second voids have respective arrangement shapes that differ from each other, and
the first void groups and the second void groups are alternately arranged around the circumferential direction of the body.

5. The tool holder as defined in claim 4, further comprising:
a first cylindrical member that is arranged on an outer periphery side of the body and is configured to move along the axial direction in conjunction with elastic deformation of the first elastic portion along the axial direction, and
a first elastic member that is arranged on an end side of the first cylindrical member closest to the tool gripping portion and is elastically deformable in conjunction with axial movement of the first cylindrical member.

6. The tool holder as defined in claim 1, wherein:
the plurality of first voids and the plurality of second voids are divided into a plurality of void groups that include the first voids and the second voids, and
at least two of the void groups are arranged so as to at least partially overlap with each other in the axial direction and in the circumferential direction of the body.

7. The tool holder as defined in claim 6, wherein:
the number of the first void groups is the same as the number of the second void groups,
the first voids are arranged in a first arrangement shape,
the second voids are arranged in a second arrangement shape that differs from the first arrangement shape, and
the first void groups and the second void groups are alternately arranged around the circumferential direction of the body.

8. The tool holder as defined in claim 1, further comprising:
a first cylindrical member that is arranged on an outer periphery side of the body and is configured to move along the axial direction in conjunction with elastic deformation of the first elastic portion along the axial direction, and
a first elastic member that is arranged on an end side of the first cylindrical member closest to the tool gripping portion and is elastically deformable in conjunction with axial movement of the first cylindrical member.

9. A tool holder, comprising:
a body having a body inner peripheral surface, a body outer peripheral surface, a shank portion on a first end side, a tool gripping portion on a second end side that is opposite of the first end side in an axial direction of the body, and a first elastic portion interposed between the shank portion and the tool gripping portion in the axial direction of the body and configured to be elastically deformable along the axial direction and around a circumferential direction of the body;

wherein:

a plurality of first voids and a plurality of second voids are defined within the first elastic portion between the body inner peripheral surface and the body outer peripheral surface, at least two of the first voids extend along the circumferential direction so as to at least partially overlap with each other in the circumferential direction of the body, at least two of the second voids extend along the axial direction so as to at least partially overlap with each other in the axial direction of the body, a plurality of first void groups includes a first sub-set of the first voids and a first sub-set of the second voids, a plurality of second void groups includes a second sub-set of the first voids and a second sub-set of the second voids, in each of the first void groups, at least one of the first voids is continuous with at least one of the second voids, in each of the second void groups, at least one of the first voids is continuous with at least one of the second voids, and the first void groups and the second void groups are alternately arranged around the circumferential direction such that the first void group and the second void group that are adjacent to each other in the circumferential direction partially overlap with each other in the circumferential direction and in the axial direction of the body.

10. The tool holder as defined in claim 9, wherein the number of first void groups is equal to the number of second void groups.

11. The tool holder as defined in claim 10, wherein the first void groups have a different arrangement shape than the second void groups.

12. The tool holder as defined in claim 11, wherein the first void groups are arranged to be point symmetrical to the second void groups around the circumferential direction.

13. The tool holder as defined in claim 12, further comprising:

a first cylindrical member that is arranged on an outer periphery side of the body and is configured to move along the axial direction in conjunction with elastic deformation of the first elastic portion along the axial direction, and a first elastic member that is arranged on an end side of the first cylindrical member closest to the tool gripping portion and is elastically deformable in conjunction with axial movement of the first cylindrical member.

14. The tool holder as defined in claim 13, further comprising:

a second cylindrical member that is arranged on an inner periphery side of the body and is configured to move along the axial direction in conjunction with axial movement of an end portion of a tool gripped by the tool gripping portion, and a second elastic member that is arranged on an end side of the second cylindrical member closest to the tool gripping portion and is elastically deformable in conjunction with axial movement of the second cylindrical member.

15. The tool holder as defined in claim 14, wherein:

the shank portion, the tool gripping portion and the first elastic portion of the body are all made of steel, and the first and second elastic members are made of rubber.

16. The tool holder as defined in claim 9, further comprising:

a first cylindrical member that is arranged on an outer periphery side of the body and is configured to move along the axial direction in conjunction with elastic deformation of the first elastic portion along the axial direction, and a first elastic member that is arranged on an end side of the first cylindrical member closest to the tool gripping portion and is elastically deformable in conjunction with axial movement of the first cylindrical member.

17. The tool holder as defined in claim 9, further comprising:

a second cylindrical member that is arranged on an inner periphery side of the body and is configured to move along the axial direction in conjunction with axial movement of an end portion of a tool gripped by the tool gripping portion, and a second elastic member that is arranged on an end side of the second cylindrical member closest to the tool gripping portion and is elastically deformable in conjunction with axial movement of the second cylindrical member.

18. The tool holder as defined in claim 9, wherein:

the first voids and the second voids included in each of the first void groups are continuous to each other, and the first voids and the second voids included in each of the second void groups are continuous to each other.

19. The tool holder as defined in claim 9, wherein:

the first void groups and the second void groups include the same number of the first voids and the same number of the second voids, and the first void groups are arranged in a different shape than the second void groups.

20. A tool holder comprising a steel tubular body having:

a shank on a first axial end portion, a tool gripping portion on a second axial end portion, and an elastic segment interposed between the shank and the tool gripping portion in the axial direction of the body, the elastic segment being more elastically deformable along the axial direction and around a circumferential direction of the steel tubular body than the shank and the tool gripping portion;

wherein:

a plurality of voids extend through the elastic segment from an outer peripheral side of the steel tubular body to an inner peripheral side of the steel tubular body, each of the plurality of voids includes: (i) at least two axially-extending void segments that extend at least substantially along the axial direction of the steel tubular body in parallel with each other and (ii) at least two circumferentially-extending void segments that extend at least substantially around the circumferential direction of the steel tubular body in parallel with each other, in each of the plurality of voids, the at least two axially-extending void segments are continuous with the at least two circumferentially-extending void segments, at least one of the axially-extending void segments of each of the plurality of voids extends between at least two of the axially-extending void segments of another of the plurality of voids, and at least one of the circumferentially-extending void segments of each of the plurality of voids extends between at least two of the circumferentially-extending void segments of another of the plurality of voids.

\* \* \* \* \*